United States Patent [19]

Smith

[11] 3,958,814
[45] May 25, 1976

[54] THREE WHEELED VEHICLE

[76] Inventor: David W. Smith, 3808 - 7A St. SW., Calgary, Alberta, Canada

[22] Filed: Dec. 18, 1974

[21] Appl. No.: 533,986

[30] Foreign Application Priority Data
Sept. 13, 1974 Canada .................................. 209172

[52] U.S. Cl. ............................... 280/269; 280/282
[51] Int. Cl.² ............................................ B62K 5/08
[58] Field of Search ........... 280/267, 269, 261, 282, 280/112 A

[56] References Cited
UNITED STATES PATENTS

| | | | |
|---|---|---|---|
| 3,447,623 | 6/1969 | Hott | 280/269 |
| 3,746,118 | 7/1973 | Altorfer | 280/112 A |
| 3,836,177 | 9/1974 | Heidt | 280/282 |

*Primary Examiner*—Robert R. Song
*Attorney, Agent, or Firm*—Stanley G. Ade

[57] ABSTRACT

Conventional vehicles such as tricycles have two wheels at the back and a single wheel at the front. Alternatively, they may be constructed with two wheels at the front and one at the rear. In all cases, however, they are of a rigid construction and cannot "lean" on corners in a manner similar to a bicycle. Because of this, turning speed is limited and riding and manoeuvering awkward. The present device has a single rear wheel and a conventional frame and propulsion means. Two front wheels are mounted on an axle and the main frame on which the rider sits is journalled on a bearing secured to the axle so that the rider may lean into the turns. This arrangement also allows the frame and the rider to remain vertical when riding on a side slope and, in addition, provides a smoother ride than does a rigid vehicle. Means are provided, operated by the rider, to lock the device solidly so that no lean is possible, to set the device so that the limited lean is available, and to set the device so that free lean is possible.

29 Claims, 9 Drawing Figures

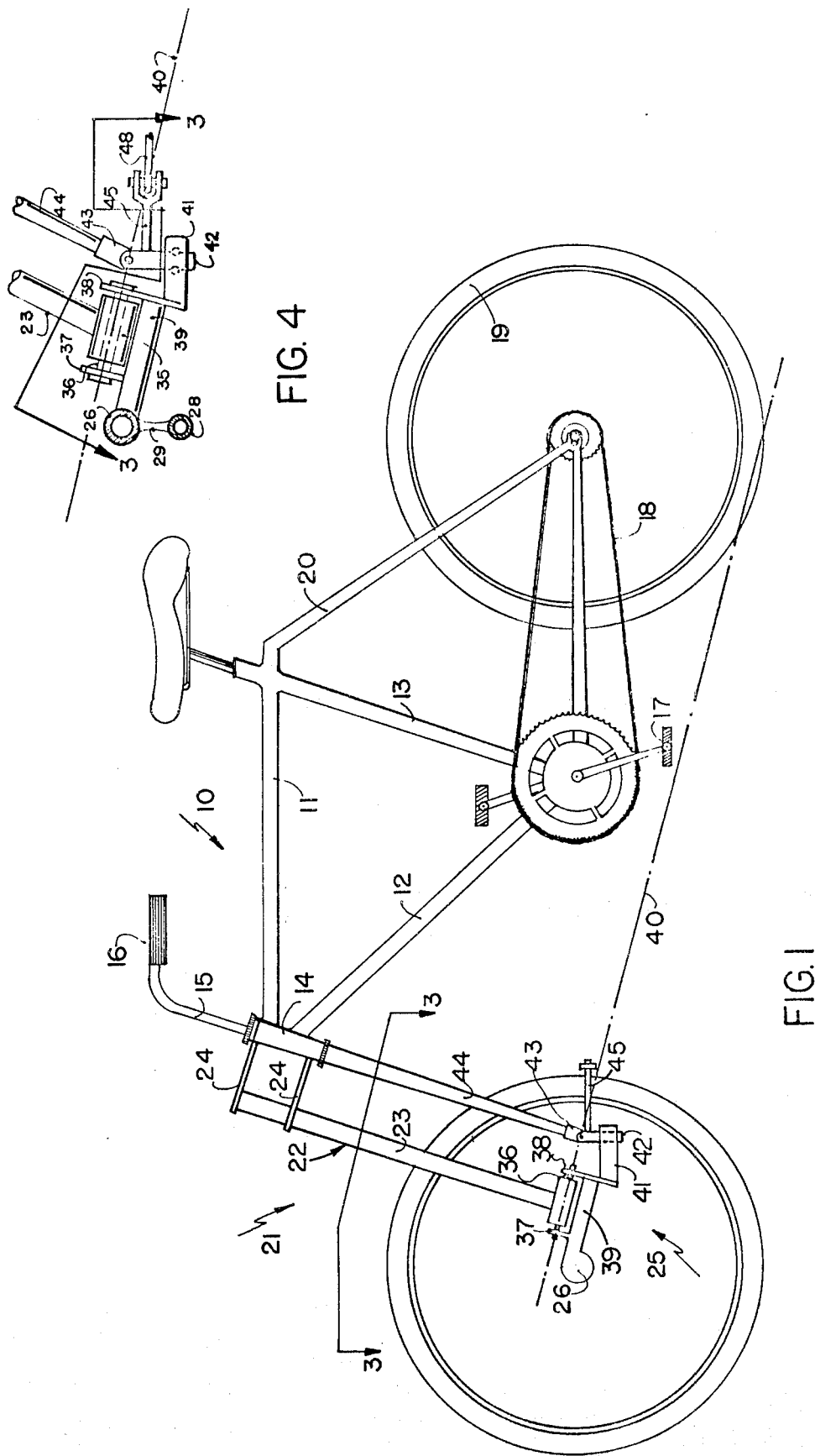

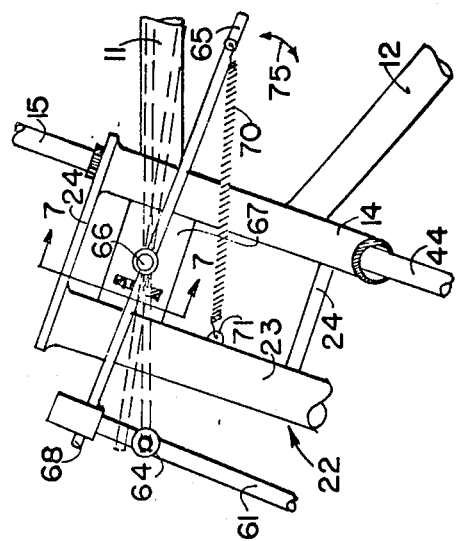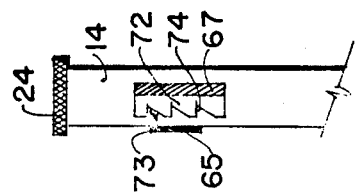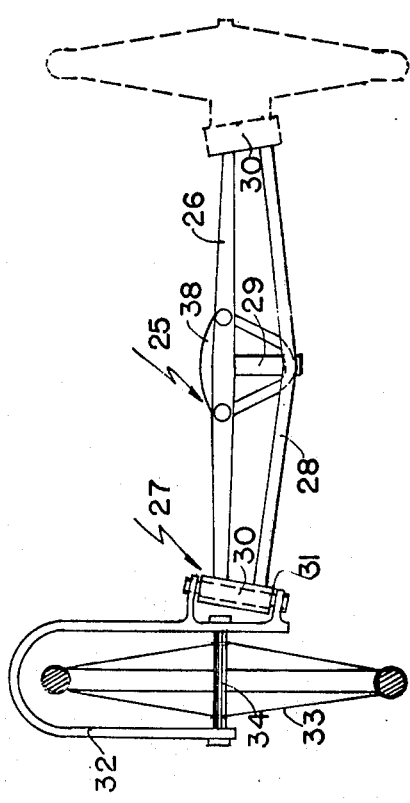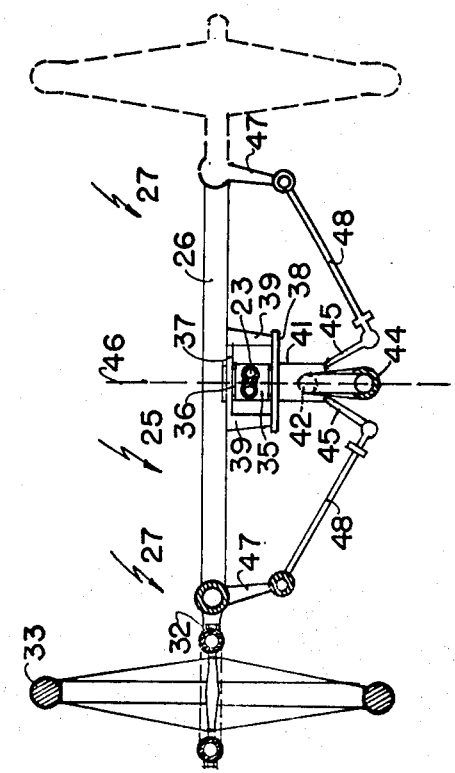
FIG. 6
FIG. 7
FIG. 2
FIG. 3

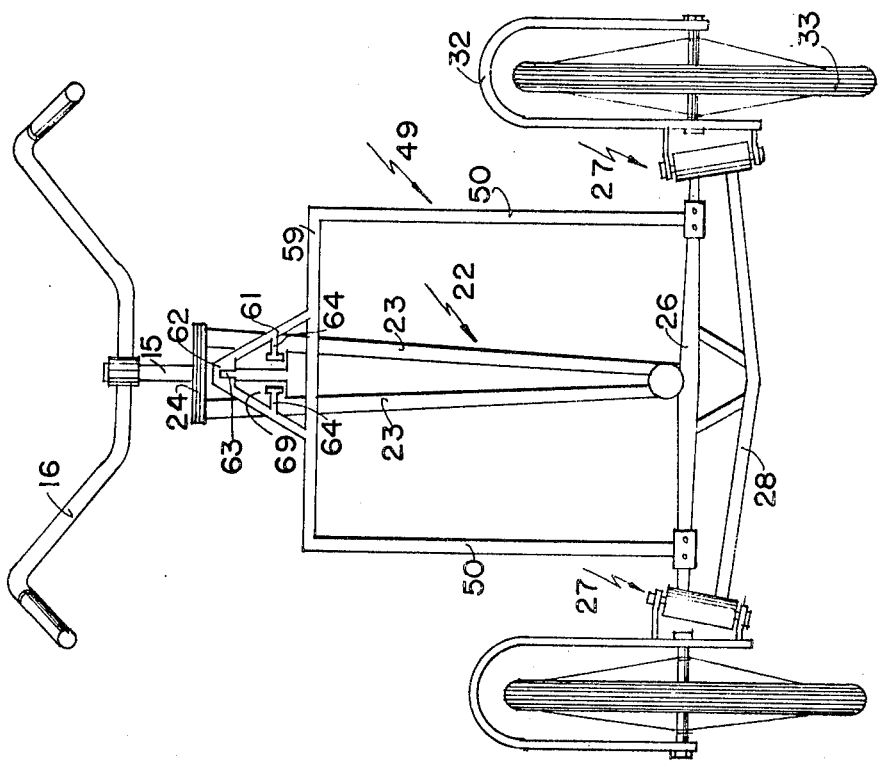
FIG. 5
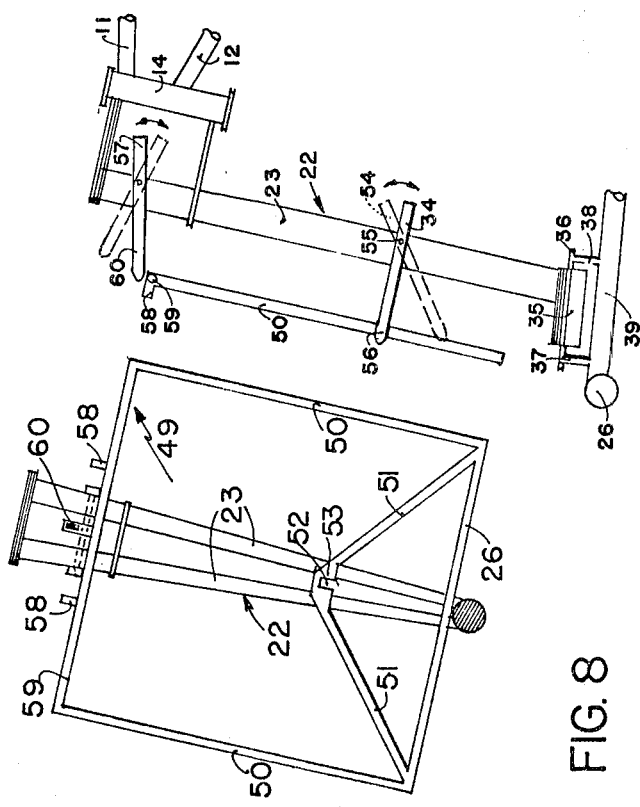
FIG. 9
FIG. 8

THREE WHEELED VEHICLE

BACKGROUND OF THE INVENTION

This invention relates to new and useful improvements in vehicles, particularly pedal propelled vehicles such as bicycles or tricycles.

Conventional three-wheeled devices of this nature usually incorporate a single front wheel with a pair of rear wheels, the single wheel being the steering wheel. Alternatively, two wheels may be provided with a single rear wheel once again with the rear wheel being the steering wheel.

However, all of these devices are of a rigid construction so that they cannot lean in the turn in a manner similar to a bicycle. This means that the speed of turning is limited, that control and manoeuverability is awkward, that the rider and frame are forced to remain perpendicular to the road surface, and that the ride is "stiff".

Furthermore, with a single front wheel, sudden braking will often upset the vehicle together with the rider because the rider's weight is thrown onto the front wheel which, being a single point of contact, is unstable.

SUMMARY OF THE INVENTION

The present invention offers an improvement over existing devices by providing a single rear wheel driven by pedals in the usual way and having a handle bar steering assembly at the front of the main frame and a pair of front wheels transversely situated and being connected to the main frame via a horizontal front axle. Means are provided to set the device in three modes.

In the free mode, the frame of the device is free to lean or roll in a manner similar to a bicycle; in the fixed mode, the leaning movement is locked to hold the frame of the device vertical. In the caution or intermediate mode, the frame is allowed to lean a few degrees, but is prevented from falling.

The mode of operation can be selected or changed by the rider while in motion, by the operation of a lever or levers at the front of the device.

With the device set in the free position, the device behaves and feels much like an ordinary bicycle; that is, the rider maintains his balance by turning the front wheels and he is free to lean into the corner while turning. However, as with a bicycle, if the rider stops or cannot balance, the frame of the device falls over in a manner similar to a bicycle. The advantage of this mode of operation is, as with a bicycle, that there is no danger of over-turning as you go around a corner because the frame leans according to the speed thereof. Also, there is no feeling of rigidity or restriction as there is a conventional three-wheeled fixed vehicle. In addition, the frame can be maintained in a vertical position while travelling along a side slope. Furthermore, if a load is being transported on the horizontal front axle, the rider does not have to balance the load as he would on a bicycle.

With the device fixed in the fixed position, it behaves like a conventional tricycle. The frame is held vertical and no balancing skill is required to ride same. However, as with any tricycle, the speed at which the operator can turn a corner is limited and if this speed is exceeded, the device turns over. However, there are advantages to this mode of operation in that the device can be ridden on ice and it can be ridden by people who do not know how to balance on a conventional bicycle. In addition, the vehicle can be parked without the aid of a stand.

With the device in the caution or intermediate position, it behaves similar to a two-wheeled vehicle with training wheels. The device is allowed to lean in a few degrees from the vertical in either direction, but will not tip over on level ground. This mode of operation may be used by individuals learning to balance or when the device is being ridden under potentially icy conditions.

The principal object and essence of the present invention is therefore to provide a device of the character herewithin described which includes a pair of transversely situated front wheels and a single rear wheel and having means whereby the main frame and rear wheel may lean into corners in a manner similar to a bicycle.

Another object of the invention is to provide a device of the character herewithin described which can be operated in any one of three modes, the first mode being the free or full leaning mode, the second mode being the fixed or rigid mode, and the third mode being the intermediate or caution mode, all three modes being selected by the rider at will.

A still further object of the invention is to provide a device of the character herewithin described which can be sold as an attachment to existing bicycles with very little modification, or alternatively, can be built onto the front end of a bicycle during construction.

A still further object of the invention is to provide a device of the character herewithin described which is particularly suited for use with a carrier situated at the front thereof and between the two front wheels. This carrier can either be used for packages or luggages, or alternatively, can incorporate a child's seat.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially of the arrangement and construction of parts all as hereinafter more particularly described, reference being had to the accompanying drawings in which:

DESCRIPTION OF THE DRAWINGS

FIG. 1 is a side elevation of the device sectioned in part to show details thereof.

FIG. 2 is a front elevation of the front wheel frame portion of the device per se.

FIG. 3 is a top plan view of the front portion of the device substantially along the line 2—2 of FIG. 1.

FIG. 4 is an enlarged fragmentary side elevation showing the connection between the front wheel frame and the head tube extension means.

FIG. 5 is a front elevation of the device showing one method of controlling the mode of operation.

FIG. 6 is a side elevation of the upper portion of FIG. 5.

FIG. 7 is a fragmentary enlarged section along the line 7—7 of FIG. 6.

FIG. 8 is a fragmentary front view of the alternate embodiment of the method of controlling the mode.

FIG. 9 is a side view of FIG. 8.

In the drawings like characters of reference indicate corresponding parts in the different figures.

DETAILED DESCRIPTION

Proceeding therefore to describe the invention in detail, reference should first be made to FIG. 1 in which reference character 10 illustrates a conventional bicycle frame including the upper horizontal bar 11, the diagonal bar 12, the shuttle support bar 13 and the head tube 14 through which the central shaft 15 of the handle bar assembly 16 extends. A pedal assembly 17 is supported at the junction of the frame members 12 and 13 and chain 18 connects to the rear wheel assembly 19 in the usual way, said rear wheel assembly being mounted in the rear forks 20, all of which is conventional. The conventional bicycle frame is used herein to illustrate and describe the device because it is familiar and convenient. However, the mechanical arrangement of the device could be applied to any three-wheeled device. For example, the rear frame could be a conventional motorcycle or could be any single-wheeled frame, conventional or unconventional.

The present device collectively designated 21 is adapted to be secured to the front of the main frame 10 and includes head tube extension means collectively designated 22 which, in this embodiment, takes the form of a pair of tubes 23 secured to brackets 24 adjacent the upper ends thereof, with said brackets in turn being secured to the head tube 14 and extending forwardly therefrom so that the head extension tubes 23 extend downwardly and forwardly substantially parallel to the head tube 14.

A front wheel structure is provided collectively designated 25 and is shown in detail in FIGS. 2 and 3.

The structure consists of a transversely situated front axle tube 26 having king pin assemblies collectively designated 27 situated on each end thereof. A bracing tube 28 extends from these assemblies underneath the front axle tube 26 and is braced therefrom from a short vertical, centrally located tube 29.

The king pin assemblies 27 each consist of a king pin bearing sleeve 30 secured to the ends of the members 26 and 28. A king pin 31 is bearingly supported within the bearing tube 30 and a front fork assembly 32 is secured adjacent either end of the king pin 31 as clearly shown in FIG. 2. These front fork assemblies 32 carry front wheels 33 upon spindles 34 in the usual manner, there being one front wheel situated at each end of the front wheel structure 25 which, when assembled, is situated transversely of the longitudinal axis of the vehicle.

Means are provided to mount the main frame to the front wheel structure and take the form of a main roll bearing housing or sleeve 35 secured to the lower end of the head frame extension tubes 23. It is situated substantially on the longitudinal axis of the main frame and extends fore and aft as clearly shown in FIG. 1 and bearingly supports a shaft 36 extending therethrough. The ends of this shaft are secured to support plates 37 and 38 which in turn are secured to the front wheel structure 25. Spaced and parallel members 39 are secured to the front axle tube 26 and extend rearwardly therefrom and support plate 38 is in turn secured to the rear ends of these members 39. This means that the entire main frame and rear wheel of the vehicle may pivot sideways on one side or the other relative to the front wheel structure 25 around the roll bearing shaft 36 which lies on the longitudinal axis of the vehicle.

Reference to FIG. 1 will also show that this roll bearing sleeve 35 and shaft 36 are inclined to the horizontal so that an extension of the axis 40 of this bearing assembly will intersect the approximate point of contact of the rear wheel 19 with surface as shown in FIG. 1. This facilitates the operation of the device and constitutes the roll axis of the vehicle.

A steering guide bearing 41 is secured to and extends rearwardly from the support plate 38 and a shaft 42 is bearingly supported therein and lies substantially vertical. A universal joint 43 is secured to the upper end of shaft 42 and an extension 44 of the central shaft 15 of the handle bar assembly, is connected to this universal joint so that turning of the handle bars will rotate the vertical shaft 42 within the steering guide bearing 41. From this point on, the steering mechanism is similar to that of a conventional automobile.

A pair of steering arms 45 are secured to this shaft 42 and extend rearwardly therefrom one upon each side of the longitudinal axis 46. Drag links 47 are secured by one end thereof to the king pin spindles or shafts 31 and extend rearwardly therefrom. Tie rods 48 are pivotally secured by one end thereof to the distal ends of each of the drag links 47 and by the other ends thereof to the distal ends of each of the steering arms 45 as clearly shown in FIG. 3.

From the foregoing it will be appreciated that turning of the handle bars rotates shaft 42 and in turn moves the two front wheels 33 in one direction or the other with both wheels moving in the same direction due to the ackerman type steering provided.

The assembly may of course be provided with toe-in, camber and castoring action as desired. As details of such adjustment are well known, it is not believed necessary to describe and illustrate same in the present specification.

From the foregoing description, it will be appreciated that the device may be driven in a manner similar to a bicycle and that as the device turns, the rider may lean into the turn in a manner similar to a bicycle with the rear wheel and main frame assembly rotating around the shaft 36 which lies on the roll axis 40.

However, it is not always desirable to maintain the device in the free or full leaning mode, so means are provided to vary this mode depending upon circumstances.

Dealing first with the embodiment illustrated in FIGS. 8 and 9, reference character 49 illustrates generally a framework which may form part of a luggage carrier situated between the two front wheels and in front of the head extension tubes 23. However, full details of this have not been illustrated because firstly, it does not form part of the invention and secondly, it would tend to obscure details of the construction.

However, this framework 49 includes vertical supports 50 secured to the front axle tube 26 and diagonal members 51 extending from points adjacent to the connection of the vertical members 50 and converging to a point 52 adjacent the extension tubes 23 so that the upper ends of these diagonal members 51 define a space 53 therebetween identified as a "locking slot".

A first lever 54 is pivoted upon pin 55 fixed to members 23 and may be moved from a position shown in phantom in FIG. 9 to a position shown in full line in FIGS. 8 and 9 at which time the front end 56 of the lever 54 engages the locking slot between the upper ends of members 51. This effectively locks the main frame of the vehicle in a vertical position relative to the front wheel frame because the framework 49 is secured to the front wheel frame.

By the same token, disengaging the lever end 56 and moving same to the position shown in phantom in FIG. 9, effectively unlocks the main frame so that the vehicle is in the free or full lean mode.

The second lever 57 is also pivoted on the extension tubes 23 adjacent the upper ends thereof and a pair of stops 58 are provided one upon each side of the upper transverse bar 59 extending between the vertical members 50 of the framework 49. With the first lever disengaged, and the second lever in the position shown in full line in FIG. 9, the end 60 of this second lever engages the stops 58 and limits the degree of lean obtainable. This stops the vehicle from falling over and is equivalent to the "learner" support wheels normally supplied on a bicycle.

When lever 57 is in the position shown in phantom in FIG. 9, then lever 54 can be moved to the free or full lean mode.

It will therefore be seen that the combination of the two levers 54 and 57 permits the three modes of operation to be attained readily and easily by the rider.

An alternate embodiment is shown in FIGS. 5, 6 and 7. In this embodiment, a similar framework 49 is provided having vertical members 50 secured to the front axle tube 26, one upon each side of the extension tubes 23. The cross member 59 also extends between the upper ends of the member 50 as clearly shown.

A pair of relatively short diagonal members 61 are secured one upon each side of the cross member 59 and extend upwardly to a common apex 62, and a slot 63 is formed in the underside of this apex and acts as the locking slot similar to locking slot 62 hereinbefore described in the previous embodiment.

A pair of stops 64 are secured one to each of the diagonal members 61 and extend inwardly towards one another and terminate in spaced relationship one from the other as clearly shown in FIG. 5.

A lever 65 is pivoted on a lever shaft 66 which in turn is mounted to a plate 67 extending between the head tube 14 and the upper ends of the head extension tubes 23 and the front end 68 of this lever extends between the extension tubes 23 and is guided by means of a pair of spaced and parallel plates 69 extending to the tubes 23 and inwardly therefrom. The space between these plates is sufficient to give free vertical movement to the end 68 of the lever 65. A spring 70 extends between the lever and an anchorage point 71 on one of the tubes 23 and normally urges the front end of the lever 68 in the upward direction. A ratchet plate 72 is secured to plate 67 and a projection 73 extends from lever 65 and may engage any one of the three notches 74 provided on the ratchet plate.

The lever mounting bearing 66 is relatively loose so that not only can the lever be moved in the direction of double headed arrow 75, but it can be moved sideways slightly to engage or disengage the projection 73 from the notches 74.

When in the position shown in full line in FIG. 6, end 68 of the lever is engaged within the locking slot 63 thus preventing relative movement between the main frame 10 of the vehicle and the front wheel frame thus maintaining the main frame in the vertical position and the vehicle in the fixed or non-leaning mode.

By moving lever 65 upwardly towards the main frame bar 11, the projection 73 engages the second notch 74 thus disengaging the end 68 from the slot 63 and placing the end 68 of the lever 65 between the stops 64. This places the vehicle in the intermediate or caution mode which while allowing a certain amount of lean during cornering, nevertheless prevents the vehicle from toppling over always provided that it is on level ground.

Further movement of lever 65 towards frame member 11 engages the projection 73 in the lowermost notch 74 with the end 68 of lever 65 being clear of tubes 61. The vehicle is then in the free mode.

The mechanism illustrated and described for positioning lever 65 in the three positions is explanatory only and may be replaced by any other desired latch type mechanism.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a wheeled vehicle which includes a main frame, a single rear wheel in said frame, a seat for the rider and a means of propulsion, a head tube on the front end of said frame and a steering means including a central shaft bearingly mounted in said tube by said central shaft; the improvement which comprises in combination head tube extension means secured to said head tube and extending downwardly therefrom, a transversely situated front wheel structure, a front wheel at each end of said front wheel structure, means bearingly mounting said wheels one to each end of said structure, bearing means mounting the lower end of said head tube extension means to said front wheel structure, said bearing means lying substantially parallel to the longitudinal axis of said vehicle whereby said main frame may lean with reference to said front wheel structure, and means operatively connecting said steering means to said front wheels whereby turning of said steering means initiates simultaneous turning of both of said front wheels, such that leaning movement and turning movement are independent of each other, said means operatively connecting said steering means to said front wheels including means extending from the lower end of said central shaft of said steering means, a steering guide bearing secured to said front wheel structure substantially intermediate the ends thereof, said means extending from the lower end of said central shaft being journalled for rotation within said steering guide bearing, steering arm means secured to said last mentioned means and extending therefrom, and linkage pivotally connected by one end thereof to said steering arm means and being operatively connected by the other ends thereof to said wheels.

2. The device according to claim 1 in which said means bearingly mounting said wheels to said front wheel structure includes a king pin assembly at each end of said front wheel structure, said king pin assembly including a bearing sleeve secured to each end of said front wheel structure and a king pin journalled within said bearing sleeve, a wheel fork assembly secured to each of said king pins, said wheels being journalled for rotation one in each of said wheel fork assemblies.

3. The device according to claim 1 in which said bearing means mounted in the lower end of said head tube extension means to said front wheel structure includes a bearing sleeve secured to said lower end of said head tube extension means and a bearing shaft journalled in said bearing sleeve, said bearing shaft means being secured to said front wheel structure.

4. The device according to claim 2 in which said bearing means mounted in the lower end of said head tube extension means to said front wheel structure includes a bearing sleeve secured to said lower end of said head tube extension means and a bearing shaft journalled in said bearing sleeve, said bearing shaft means being secured to said front wheel structure.

5. The device according to claim 2 in which said linkage includes a drag link secured to each of said king pins and a tie rod pivotally secured by one end thereof to each of said drag links and by the other ends thereof to said steering arm means.

6. The device according to claim 4 in which said linkage includes a drag link secured to each of said king pins and a tie rod pivotally secured by one end thereof to each of said drag links and by the other ends thereof to said steering arm means.

7. In a wheeled vehicle which includes a main frame, a single rear wheel in said frame, a seat for the rider and a means of propulsion, a head tube on the front end of said frame and a steering means including a central shaft bearingly mounted in said tube by said central shaft; the improvement which comprises in combination head tube extension means secured to said head tube and extending downwardly therefrom, a transversely situated front wheel structure, a front wheel at each end of said front wheel structure, means bearingly mounting said wheels one to each end of said structure, bearing means mounting the lower end of said head tube extension means to said front wheel structure, said bearing means lying substantially parallel to the longitudinal axis of said vehicle whereby said main frame may lean with reference to said front wheel structure, and means operatively connecting said steering means to said front wheels whereby turning of said steering means initiates simultaneous turning of both of said front wheels and means to set the relationship between said main frame and said front wheel structure in any one of three positions, a fixed and non-leaning position, a free full leaning position, and an intermediate position whereby the degree of lean is limited.

8. The device according to claim 7 in which said means bearingly mounting said wheels to said front wheel structure includes a king pin assembly at each end of said front wheel structure, said king pin assembly including a bearing sleeve secured to each end of said front wheel structure and a king pin journalled within said bearing sleeve, a wheel fork assembly secured to each of said king pins, said wheels being journalled for rotation one in each of said wheel fork assemblies.

9. The device according to claim 7 in which said bearing means mounted in the lower end of said head tube extension means to said front wheel structure includes a bearing sleeve secured to said lower end of said head tube extension means and a bearing shaft journalled in said bearing sleeve, said bearing shaft means being secured to said front wheel structure.

10. The device according to claim 8 in which said bearing means mounted in the lower end of said head tube extension means to said front wheel structure includes a bearing sleeve secured to said lower end of said head tube extension means and a bearing shaft journalled in said bearing sleeve, said bearing shaft means being secured to said front wheel structure.

11. The device according to claim 7 in which said means operatively connecting said steering means to said front wheels including means extending from the lower end of said central shaft of said steering means, a steering guide bearing secured to said front wheel structure substantially intermediate the ends thereof, said means extending from the lower end of said central shaft being journalled for rotation within said steering guide bearing, steering arm means secured to said last mentioned means and extending therefrom, and linkage pivotally connected by one end thereof to said steering arm means and being operatively connected by the other ends thereof to said wheels.

12. The device according to claim 8 in which said means operatively connecting said steering means to said front wheels including means extending from the lower end of said central shaft of said steering means, a steering guide bearing secured to said front wheel structure substantially intermediate the ends thereof, said means extending from the lower end of said central shaft being journalled for rotation within said steering guide bearing, steering arm means secured to said last mentioned means and extending therefrom, and linkage pivotally connected by one end thereof to said steering arm means and being operatively connected by the other ends thereof to said wheels.

13. The device according to claim 9 in which said means operatively connecting said steering means to said front wheels including means extending from the lower end of said central shaft of said steering means, a steering guide bearing secured to said front wheel structure substantially intermediate the ends thereof, said means extending from the lower end of said central shaft being journalled for rotation within said steering guide bearing, steering arm means secured to said last mentioned means and extending therefrom, and linkage pivotally connected by one end thereof to said steering arm means and being operatively connected by the other ends thereof to said wheels.

14. The device according to claim 10 in which said means operatively connecting said steering means to said front wheels including means extending from the lower end of said central shaft of said steering means, a steering guide bearing secured to said front wheel structure substantially intermediate the ends thereof, said means extending from the lower end of said central shaft being journalled for rotation within said steering guide bearing, steering arm means secured to said last mentioned means and extending therefrom, and linkage pivotally connected by one end thereof to said steering arm means and being operatively connected by the other ends thereof to said wheels.

15. The device according to claim 7 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

16. The device according to claim 8 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

17. The device according to claim 9 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

18. The device according to claim 10 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

19. The device according to claim 11 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

20. The device according to claim 12 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

21. The device according to claim 13 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

22. The device according to claim 14 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

23. The device according to claim 8 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

24. The device according to claim 9 in which said means to set the relationship between said main frame and said front wheel structure includes a framework extending upwardly from said front wheel structure to adjacent said steering means, a lever pivoted intermediate the ends thereof to said main frame and engaging said framework to lock said main frame in a vertical position relative to said front wheel structure when in the fixed position, and stop means on each side of said framework engageable by the said lever when in the intermediate position, said lever being disengaged from said framework and said stop means when in the free position.

25. The device according to claim 10 in which said means to set the relationship between said main frame and said front wheel structure includes a framework extending upwardly from said front wheel structure to adjacent said steering means, a first lever pivoted intermediate the ends thereof to said head frame extension means and engaging said framework when in the fixed non-leaning position and disengaging from said framework when in the free full leaning position, a second lever pivoted intermediate the ends thereof to said head frame extension means above said first lever and stop means on said framework adjacent said second lever, said second lever engaging said stop means when in the intermediate position and disengaging from said stop means when in the other two positions, said first lever being disengaged from said framework when said second lever is in the intermediate position.

26. The device according to claim 11 in which said means to set the relationship between said main frame and said front wheel structure includes a framework extending upwardly from said front wheel structure to adjacent said steering means, a first lever pivoted intermediate the ends thereof to said head frame extension means and engaging said framework when in the fixed non-leaning position and disengaging from said framework when in the free full leaning position, a second lever pivoted intermediate the ends thereof to said head frame extension means above said first lever and stop means on said framework adjacent said second lever, said second lever engaging said stop means when in the intermediate position and disengaging from said stop means when in the other two positions, said first lever being disengaged from said framework when said second lever is in the intermediate position.

27. The device according to claim 12 in which said means to set the relationship between said main frame and said front wheel structure includes a framework extending upwardly from said front wheel structure to adjacent said steering means, a first lever pivoted intermediate the ends thereof to said head frame extension means and engaging said framework when in the fixed non-leaning position and disengaging from said framework when in the free full leaning position, a second lever pivoted intermediate the ends thereof to said head frame extension means above said first lever and stop means on said framework adjacent said second lever, said second lever engaging said stop means when in the intermediate position and disengaging from said stop means when in the other two positions, said first lever being disengaged from said framework when said second lever is in the intermediate position.

28. The device according to claim 13 in which said means to set the relationship between said main frame and said front wheel structure includes a framework extending upwardly from said front wheel structure to adjacent said steering means, a first lever pivoted intermediate the ends thereof to said head frame extension means and engaging said framework when in the fixed non-leaning position and disengaging from said framework when in the free full leaning position, a second lever pivoted intermediate the ends thereof to said head frame extension means above said first lever and stop means on said framework adjacent said second lever, said second lever engaging said stop means when in the intermediate position and disengaging from said stop means when in the other two positions, said first lever being disengaged from said framework when said second lever is in the intermediate position.

29. The device according to claim 14 in which said means to set the relationship between said main frame and said front wheel structure includes a framework extending upwardly from said front wheel structure to adjacent said steering means, a first lever pivoted intermediate the ends thereof to said head frame extension means and engaging said framework when in the fixed non-leaning position and disengaging from said framework when in the free full leaning position, a second lever pivoted intermediate the ends thereof to said head frame extension means above said first lever and stop means on said framework adjacent said second lever, said second lever engaging said stop means when in the intermediate position and disengaging from said stop means when in the other two positions, said first lever being disengaged from said framework when said second lever is in the intermediate position.

* * * * *